(12) United States Patent
Balkoski et al.

(10) Patent No.: US 12,223,581 B2
(45) Date of Patent: Feb. 11, 2025

(54) SIMULATION OF CLOUD DATA FOR MACHINE LEARNING TRAINING

(71) Applicant: Matterport, Inc., Sunnyvale, CA (US)

(72) Inventors: Kevin Balkoski, San Mateo, CA (US); Eleanor Crane, Sunnyvale, CA (US)

(73) Assignee: Matterport, Inc., Sunnyvale, CA (US)

( * ) Notice: Subject to any disclaimer, the term of this patent is extended or adjusted under 35 U.S.C. 154(b) by 111 days.

(21) Appl. No.: 17/936,363

(22) Filed: Sep. 28, 2022

(65) Prior Publication Data

US 2023/0098138 A1    Mar. 30, 2023

Related U.S. Application Data

(60) Provisional application No. 63/249,566, filed on Sep. 28, 2021.

(51) Int. Cl.
| | |
|---|---|
| *G06T 15/06* | (2011.01) |
| *G01S 7/48* | (2006.01) |
| *G06F 18/214* | (2023.01) |

(52) U.S. Cl.
CPC ............ *G06T 15/06* (2013.01); *G06F 18/214* (2023.01); *G01S 7/4802* (2013.01); *G06T 2210/56* (2013.01)

(58) Field of Classification Search
CPC ... G06T 15/06; G06T 2210/56; G06F 18/214; G01S 7/4802; G01S 17/89; G06V 10/774
See application file for complete search history.

(56) References Cited

U.S. PATENT DOCUMENTS

| | | | | |
|---|---|---|---|---|
| 2008/0088622 A1* | 4/2008 | Shearer | ................... | G06T 15/06 345/420 |
| 2008/0161005 A1* | 7/2008 | Sato | ...................... | H04B 17/327 455/446 |
| 2009/0167763 A1* | 7/2009 | Waechter | ................ | G06T 15/40 345/426 |
| 2013/0293545 A1* | 11/2013 | Moore | .................. | G06T 15/506 345/426 |
| 2015/0199838 A1* | 7/2015 | Itoh | ........................ | G06T 15/06 345/426 |

(Continued)

OTHER PUBLICATIONS

Liu, Zongyuan, et al. "Precise optical modeling of blue light-emitting diodes by Monte Carlo ray-tracing." Optics express 18.9 (2010): 9398-9412. (Year: 2010).*

*Primary Examiner* — Ryan M Gray
(74) *Attorney, Agent, or Firm* — Ahmann Kloke LLP

(57) ABSTRACT

An example method comprises simulating an environment including at least one simulated object, a simulated ray source, and a simulated receiver, simulating a plurality of rays emitting from the simulated ray source, tracking each ray in the environment, detecting changes for at least one ray that interacts with the at least one simulated object, the changes for the at least one ray including a reflection from the at least one object, tracking the reflection of the at least part of the ray from the at least one object in the environment, determining measurements for any of the plurality of rays that interact with the simulated receiver in the simulation, the at least part of the ray being received by the receiver, the measurements including intensity for any of the plurality of rays that interact with the receiver, and generating synthetic point cloud data based on the measurements.

13 Claims, 14 Drawing Sheets

(56) References Cited

U.S. PATENT DOCUMENTS

| | | | | |
|---|---|---|---|---|
| 2016/0125642 A1* | 5/2016 | Zhu | ........................ | G06T 17/20 |
| | | | | 345/421 |
| 2018/0350128 A1* | 12/2018 | Bakalash | .............. | G06T 15/506 |
| 2020/0250363 A1* | 8/2020 | Partridge | ................ | G06F 30/20 |
| 2020/0301799 A1* | 9/2020 | Manivasagam | ....... | G01S 17/006 |

* cited by examiner

| Item | Format | Size | Required |
|---|---|---|---|
| X | long | 4 bytes | * |
| Y | long | 4 bytes | * |
| Z | long | 4 bytes | * |
| Intensity | unsigned short | 2 bytes | |
| Return Number | 3 bits (bits 0 – 2) | 3 bits | * |
| Number of Returns (given pulse) | 3 bits (bits 3 – 5) | 3 bits | * |
| Scan Direction Flag | 1 bit (bit 6) | 1 bit | * |
| Edge of Flight Line | 1 bit (bit 7) | 1 bit | * |
| Classification | unsigned char | 1 byte | * |
| Scan Angle Rank (-90 to +90) – Left side | char | 1 byte | * |
| User Data | unsigned char | 1 byte | |
| Point Source ID | unsigned short | 2 bytes | * |

FIG. 13

SIMULATION OF CLOUD DATA FOR MACHINE LEARNING TRAINING

CROSS-REFERENCE TO RELATED APPLICATIONS

The present patent application claims priority from, and is a non-provisional application of, U.S. Provisional Patent Application No. 63/249,566, entitled "Simulate a 3D LIDAR Scan for Training a Machine Learning Model," filed Sep. 28, 2021, which is incorporated by reference herein.

FIELD OF THE INVENTION(S)

The present invention(s) generally relates to systems and methods for generating synthetic point cloud data, and more particularly to systems and methods for simulation of scanning a scene and ray tracing to generate measurements and cloud data for machine learning training.

BACKGROUND

Training a machine learning model to recognize features in a 3D point cloud, gathered via a LiDAR scan, requires many instances of labeled 3D point cloud datasets. The usual method of obtaining labeled 3D point cloud datasets includes obtaining a 3D point cloud and labeling each point of interest in the point cloud using manual techniques (i.e., a person identifies points of interest and manually provides or selects a label).

Labels, for example, may identify object properties such as class (vegetation, building, road, vehicle, . . . ), instance identifier (building A, building B, . . . ), and/or the like. Because of the large number of points present in a point cloud, the act of manually labeling each point is both costly and prone to error.

SUMMARY

An example method comprises simulating an environment including at least one simulated object, a simulated ray source, and a simulated receiver, simulating a plurality of rays emitting from the simulated ray source within the environment, tracking each ray of the plurality of rays in the environment, detecting changes for at least one ray that interacts with the at least one simulated object, the changes for the at least one ray including a reflection of at least part of the ray from the at least one object;

tracking the reflection of the at least part of the ray from the at least one object in the environment, determining measurements for any of the plurality of rays that interact with the simulated receiver in the simulation, the at least part of the ray being received by the receiver, the measurements including intensity for any of the plurality of rays that interact with the receiver, and generating synthetic point cloud data based on the measurements.

In some embodiments, the simulated ray source is a simulate LiDAR device. The at least one simulated object may include properties for absorption and reflectivity that define, at least in part, physics of the at least one ray upon interaction with the at least one simulated object in the simulation. Direction and energy of the at least one ray may be determined in the simulation upon interaction with the at least one object. The simulation may continue to emit rays from the simulated ray source until a predetermined number of interactions between rays and the simulated receiver in the simulation are determined.

In various embodiments, measurements are not determined for one or more rays of the plurality of rays are absorbed by the at least one object when the one or more rays interacts with the at least one object.

Simulating the plurality of rays emitting from the simulated ray source within the environment may comprise retrieving a range of directions from the simulated ray source, the range of directions being a property of the simulated ray source, determining a particular direction for each ray of the plurality of rays randomly from the range of directions, and emitting each of the plurality of rays from the particular direction of the simulated ray source in the environment. Simulating the plurality of rays emitting from the simulated ray source within the environment may also comprise retrieving a range of wavelengths from the simulated ray source, the range of wavelengths being a property of the simulated ray source, determining a particular wavelength for each ray of the plurality of rays randomly from the range of wavelengths, and emitting each of the plurality of rays at the particular wavelength from the simulated ray source in the environment. In some embodiments, simulating the plurality of rays emitting from the simulated ray source within the environment comprises retrieving a range of energy from the simulated ray source, the range of energy being a property of the simulated ray source, determining a particular energy for each ray of the plurality of rays randomly from the range of energy, and emitting each of the plurality of rays at the particular energy from the simulated ray source in the environment.

An example computer-readable medium readable by at least one processor may comprise instructions to configure the processor to perform a method, the method comprising: comprises simulating an environment including at least one simulated object, a simulated ray source, and a simulated receiver, simulating a plurality of rays emitting from the simulated ray source within the environment, tracking each ray of the plurality of rays in the environment, detecting changes for at least one ray that interacts with the at least one simulated object, the changes for the at least one ray including a reflection of at least part of the ray from the at least one object, tracking the reflection of the at least part of the ray from the at least one object in the environment, determining measurements for any of the plurality of rays that interact with the simulated receiver in the simulation, the at least part of the ray being received by the receiver, the measurements including intensity for any of the plurality of rays that interact with the receiver, and generating synthetic point cloud data based on the measurements.

An example system comprises an environment module, a simulation module, a ray tracking module, and a cloud generation module. The environment module may be configured to control a processor to simulate an environment including at least one simulated object, a simulated ray source, and a simulated receiver. The simulation module may be configured to control a processor to simulate a plurality of rays emitting from the simulated ray source within the environment. The ray tracking module may be configured to control a processor to track each ray of the plurality of rays in the environment, detect changes for at least one ray that interacts with the at least one simulated object, the changes for the at least one ray including a reflection of at least part of the ray from the at least one object, track the reflection of the at least part of the ray from the at least one object in the environment, and determine measurements for any of the plurality of rays that interact with the simulated receiver in the simulation, the at least part of the ray being received by the receiver, the measurements including intensity for any of the plurality of rays that interact with the receiver. The cloud generation module may be configured to control a processor to generate synthetic point cloud data based on the measurements.

BRIEF DESCRIPTION OF THE DRAWINGS

In the drawings, wherein like reference characters denote corresponding or similar elements throughout the various figures:

FIG. 13 shows a data format example for some embodiments.

DETAILED DESCRIPTION

One important application of Light Detection and Ranging (LiDAR) technology is the creation of high-resolution models that capture the shape of an environment. The environment may be an outdoor environment or a building interior. For example, LiDAR may be used to scan a room or floor of a building interior to identify walls, floors, furniture, fixtures, and/or the like.

LiDAR samples of a surrounding environment may be represented as points in a 3D space. The collection of LiDAR samples may be referred as a point cloud. Point cloud data is a cluster of three-dimensional data points. The point cloud data may include attributes such as intensity or color information when laser scanners are integrated with digital cameras.

In various embodiments, the approaches described herein reduce effort, reduce error, and increase speed (and therefore scale) of obtaining point cloud data for labeling and training. In various embodiments, an output of a LiDAR scan is simulated to generate point cloud data. Each point may be a simulation of a sensor emitting an electromagnetic ray which returns to the sensor after reflecting off an object in a scene. The point cloud is a collection of millions of such points which represent a complete 3D scan of the simulated scene from one or more LiDAR sensors.

Monte Carlo techniques may be added to the process of simulating a ray's path to more accurately model multiple real-world imperfections, including sensor equipment, surface and volume material properties of scene objects, and the space in which the ray travels. The appropriate labels may be automatically generated during the simulation process, thus avoiding errors due to manual labeling.

Figure 1:
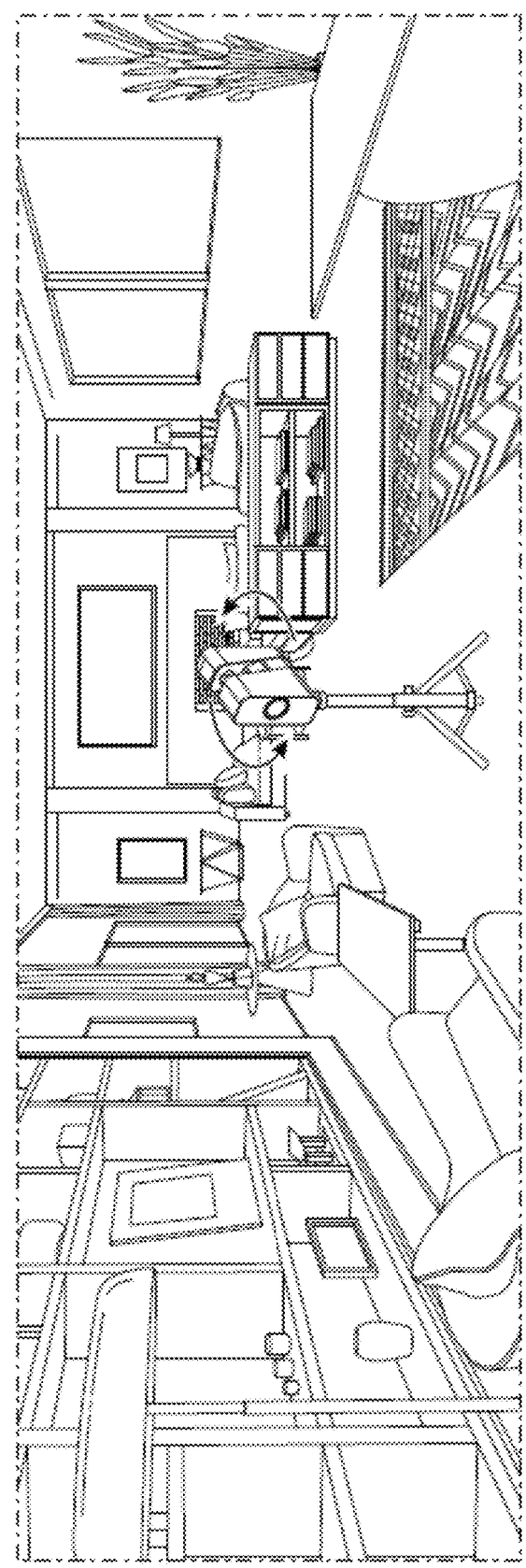
FIG. 1 depicts a simulation of a LiDAR configured to collect measurements of a surrounding simulated environment in some embodiments.

FIG. 1 depicts a simulation of a LiDAR configured to collect measurements of a surrounding simulated environment in some embodiments. In various embodiments, a digital device, such as a synthetic cloud data generation system 200 discussed with regard to FIG. 2, may create the simulation of the LiDAR as well as the simulated environment, simulate generation and tracking of rays from the simulated LiDAR within the simulated environment, determine measurements based on the simulation of those rays that are received by one or more receivers (e.g., in the LiDAR), and generate a point cloud based on the measurements. In many examples discussed herein, a point cloud is a collection of millions of such points which are produced from a 3D scan of a target scene from one or more LiDAR sensors.

Figure 2:
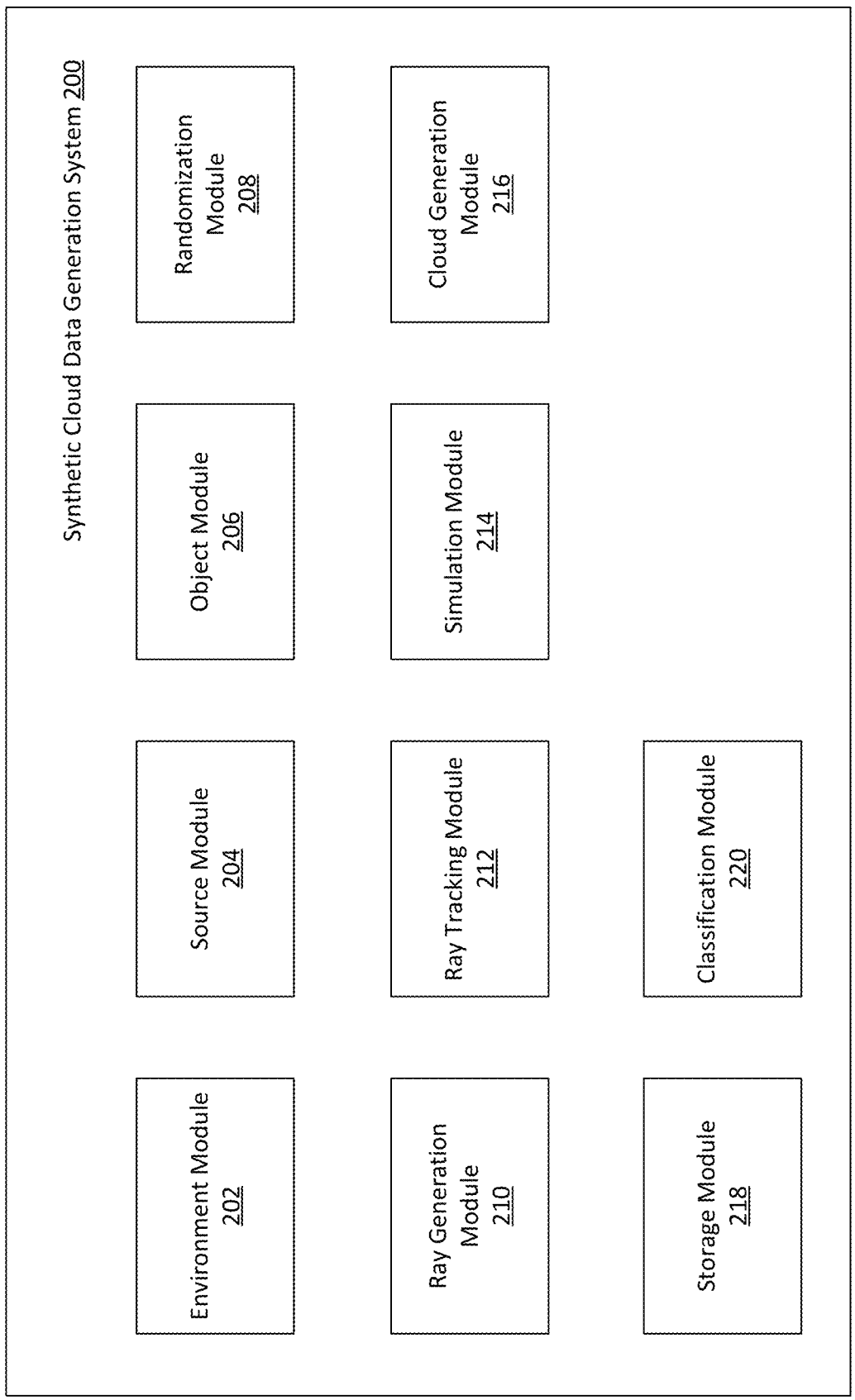
FIG. 2 is a synthetic cloud data generation system 200 in some embodiments.

The synthetic cloud data generation system 200 discussed with regard to FIG. 2 may utilize Monte Carlo techniques to simulate each ray path to more accurately model multiple real-world imperfections, including sensor equipment, surface and volume material properties of scene objects, and the space in which the ray travels. In some embodiments, appropriate labels may be automatically generated during the simulation process, thus avoiding errors due to manual labeling.

Although FIG. 1 depicts a single LiDAR within a simulated environment, it will be appreciated that the synthetic cloud data generation system 200 may simulate any number of LiDAR sources in the simulated environment. As follows, the synthetic cloud generation system 200 may process and track rays from any number of LiDAR sources and take measurements (either in parallel, near parallel, or serially). Similarly, the synthetic cloud generation system 200 may generate any number of simulated environments, each containing any number of LiDAR sources. In this example, the synthetic cloud generation system 200 may generate any number of simulated environments, track or process any number of rays from any number of LiDAR sources in those environments, and take measurements in parallel, near parallel, or serially. In some embodiments, it will be appreciated that by simulating multiple environments with any number of LiDAR sources in order to track rays take measurements and generate cloud data, the synthetic cloud generation system 200 may greatly scale synthetic cloud data generation thereby allowing scaling of machine learning model training, classification training, curation, testing, verification of model training, and the like.

FIG. 2 is a synthetic cloud data generation system 200 in some embodiments. The synthetic cloud data generation system 200 may include one or more digital devices. A digital device may be any hardware device with memory and a hardware processor.

In this example, the synthetic cloud data generation system 200 comprises an environment module 202, a source module 204, an object module 206, a randomization module 208, a ray generation module 210, a ray tracking module 212, a simulation module 214, a cloud generation module 216, a storage module 218, and classification module 220.

The environment module 202 may generate a simulated environment or synthetic scene. In various embodiments, a user may select or provide configuration(s) of the type of space to be simulated. For example, the user may select a furnished or unfurnished residential environment or office environment. In another example, the user may select an industrial environment. The simulated environment may be indoors, outdoors, or partially outdoors. In various embodiments, the simulated environment may be in nature (e.g., a forest, cave, beach, or the like). In a further example, the user may select a particular residential environment such as a home office, living room, bedroom, kitchen, garage, attic, bathroom, and/or the like.

In some embodiments, the user may provide a size or range for the size of the environment (e.g., the size of a room for simulation). Alternately, the environment module 202 may select a size based on the type of environment (e.g., using randomization from the randomization module 208 within a range that is associated with each environment type). The synthetic cloud data generation system 200 may receive the selection and then may select an area that the environment may represent (e.g., including a size of the the and/or environment).

The simulated environment may include objects distributed across the extent of the simulated space. Each object may have a defined 3D geometry. The synthetic cloud data generation system 200 may select any number of objects within the environment and distribute the objects (e.g., either randomly or in places where the objects are most likely to be found). In some embodiments, objects may be associated with position properties that define a likelihood of an object's position (e.g., number of a type of objects, placement of object, size of object relative to the environment, and/or the like). For example, if the user selects a furnished, residential environment, the environment module 202 may select objects representing a sofa, end tables, chairs, entertainment center, and the like. The environment module 202 may select one sofa as being the likely number within single area of the residence, may select a size of sofa being a fractional portion of the length of the residential environment, and position the sofa against a wall as being more likely based on the position properties of the sofa. Position properties of the other furnishings may also govern the type of object, position of object, size of object, and the like.

The source module 204 may generate and/or define properties for any number of simulated ray sources (i.e., "sources). A ray source is an object or point where rays are emitted (e.g., a LiDAR source such as a LiDAR camera, scanning device, or the like). It will be appreciated that a simulated ray source could be represented as light bulb, an LED, the sun, a laser, fire, or the like. In some embodiments discussed herein, the source is a simulated LiDAR device.

The source module 204 may define any number of the following source properties for each simulated ray source, including, for example, position (x, y, z), shape, power, emission direction (i, j, k)/($\alpha$, $\beta$, $\gamma$), and wavelength ($\lambda$). The position property may refer to the position of the simulated ray source in the simulation.

The emission direction property may refer to the direction of one or more rays from the ray source. It will be appreciated that the simulated ray source may emit simulated rays in a number of directions. The direction of the rays emitted in the simulation may be determined by the ray generation module 210 (and/or the randomization module 208) discussed herein. In some embodiments, the emission direction may be either a static value (e.g., 0, 0, −1) or a distribution/function.

The shape property may refer to the shape of the ray source and/or shape of the ray(s) emitted from the ray source in the simulation. The power property of the ray source refers to the power that the ray source may provide to any number of rays. The wavelength property may be either a static value (e.g., 530 nm) or a distribution/function.

In various embodiments, the synthetic cloud data generation system 200 defines one or more properties of any number of ray sources. One or more properties of ray sources may be provided by a user that configures the simulation. In various embodiments, the user or a database of properties of physical ray sources (e.g., physical LiDAR cameras) may provide specific values for ray source properties and/or may provide a range for one or more ray source properties (e.g., a particular ray source may include a range of possible wavelengths that may be emitted by the ray source). In some embodiments, the source module 204 utilizes randomization to determine one or more ray source properties (e.g., within a range). Randomization may be provided by the randomization module 208 discussed herein.

Figure 5:
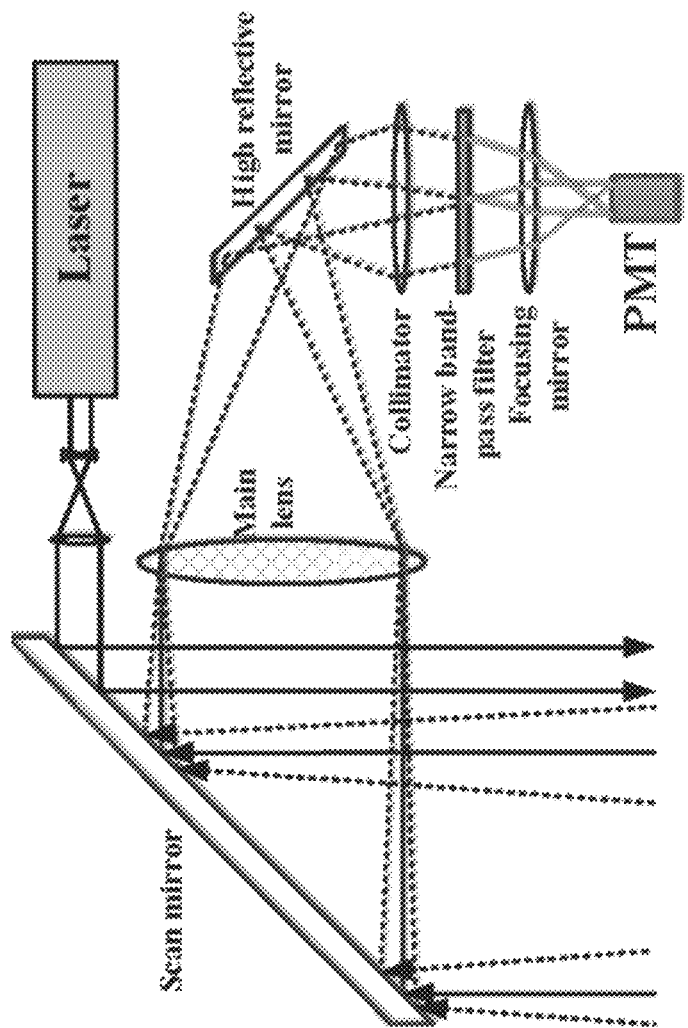
FIG. 5 outlines primary sub-components that make up a typical LiDAR sensor.
Figure 4:
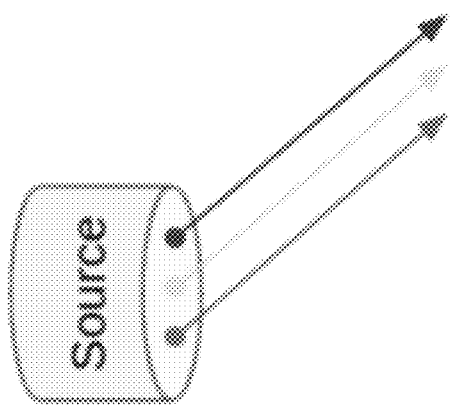
FIG. 4 is an example source with a distribution of wavelengths.

FIG. 4 is an example source with a distribution of wavelengths. In some embodiments, the most important component to model for ray tracing is the sensor system (e.g., of the simulated source), particularly when that sensor contains an active source. FIG. 5 outlines primary sub-components that make up a typical LiDAR sensor. In this example, light is emitted from a laser in pulses typical with wavelengths of 532, 1064, or 1500 nm. The pulse is reflected off of the scan mirror and directed into the environment. Light is then returned from the environment and is redirected by a series of optics (mirrors and lenses) to a receiver able to measure the intensity of the returned light. The configuration of the optical elements may vary from manufacturer to manufacturer but the general configuration typically holds.

The object module 206 may generate and define any number of objects. An object is a model of a physical object which may include or be a lens, a mirror, air, paper, a wall, a car, or the like. In some embodiments, an object can be a single primitive shape (e.g., sphere, cylinder, cube, or the like) or a collection of primitives. Generally, air or vacuum is an infinitely large "object" surrounding all other objects. Typically, objects are interaction opportunities for rays.

In the example discussed herein, a simulated environment may be an indoor room. Objects in the room may include floors, walls, a ceiling, furniture, lamps, decorations, and/or the like.

In some embodiments, the 3D geometry of an object may be achieved using a polygonal mesh and/or material properties. In various embodiments, each object may object properties, volume properties, and surface properties. Object properties may include shape and position. Volume and material properties may define how light is reflected, refracted, transmitted, and absorbed.

A simulated object may have one or more of the following object properties:

Position (x, y, z)
Shape

The position property of the object may define the position of the object within the environment. The position property of the object may define a center point of the object within the environment and/or may define the position of the perimeter of the object. The shape property of the object may define the form of an object or its outline, outer boundary, and/or outer surface. Object properties may be generated or selected from a plurality of object properties for the particular object by the environment module 202 and/or the object module 206.

Some examples of surface properties associated with an object may include:
Absorptivity (α)
Reflectivity (ρ)
Transmissivity (τ)

Figure 6:
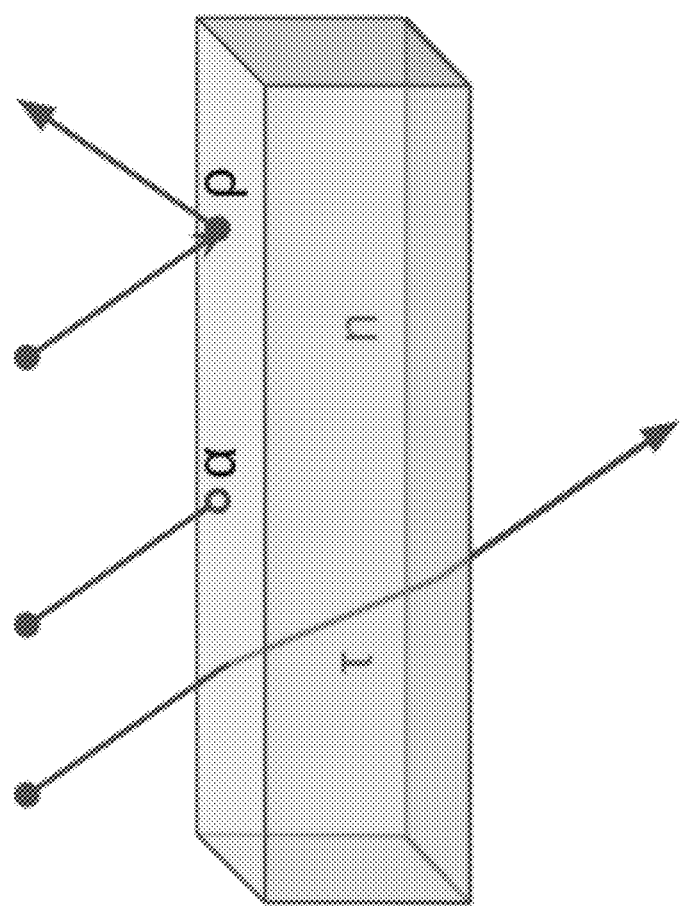
FIG. 6 depicts an example of a translucent object with rays demonstrating the effects of various properties in some embodiments.

Some examples of volume properties associated with an object may include:
Index of refraction (n)
Attenuation/scattering properties FIG. 6 depicts an example of a translucent object with rays demonstrating the effects of various properties in some embodiments. Absorptivity (α), depicted in FIG. 6, refers to the degree to which an object absorbs energy (e.g., the energy of a ray emitted from a simulated source that hits the simulated object in the simulated environment).

Reflectivity (ρ), depicted in FIG. 6, refers to the degree to which an object reflects light or radiation (e.g., as measured independently of the thickness of a material). For example, the reflectivity property of a particular object (or type of object) may indicate the degree to which the light or energy of a ray (e.g., emitted from a simulated source that hits the simulated object in the simulated environment) is reflected from the simulated object.

Transmissivity (τ), depicted in FIG. 6, refers to the degree to which light or radiation is allowed to pass through the object or object type. For example, the transmissivity property of a particular object (or type of object) may indicate the degree to which the light or energy of a ray (e.g., emitted from a simulated source that hits the simulated object in the simulated environment) may be transmitted through the simulated object (e.g., particularly if the object is transparent or partially transparent).

Index of refraction (n), depicted in FIG. 6, indicates the angle(s) of the bending of light when passing through the simulated object. For example, the index of refraction property of a particular object (or type of object) may indicate the degree to which the light or energy of a ray (e.g., emitted from a simulated source that hits the simulated object in the simulated environment) bends when passing through the simulated object (e.g., particularly if the object is transparent or partially transparent).

Attenuation refers to the degree of loss of energy or light of the ray as it passes through the object or type of object.

If an object is completely opaque, the object may have no volume properties or the volume properties will have an index of refraction indicating no refraction, a transmissivity property indicating no transmissivity, and an attenuation property indicating no attenuation.

The one or more surface properties of a simulated object may be programmed from many different sources. For example, the surface properties of an object may be manually coded. One or more surface properties may be transferred from objects of similar type (e.g., objects that are classified as "upholstered chair" may inherit one or more surface objects from other chair objects and/or upholstered objects). Some objects may inherit one or more surface properties from any number of simulated objects of similar type. In some embodiments, some surface properties of an object may be manually coded and/or updated while other surface properties may be inherited from any number of other objects.

In some embodiments, an object or part of the environment (e.g., wall, floor, or the like) may have one or more volume properties.

In addition to rays and objects, the simulation may include materials or volumes. Similar to objects, there are several types of properties material or volume can have. It will be appreciated that an object may have a material or volume property as well. Material properties may include:
Positional: Position within the simulated environment
Wavelength-based properties:
    Uniform/isotropic: the property may be the same for any point on a surface/within a volume
    Gradient: the property transitions from point A to point B
    Grey property: the property may be the same or different for different wavelengths
    Wavelength dependent: the property may be a function of the wavelength. For example, chrome has high reflectivity for visible light but has a high absorptivity in infrared.
Ray incidence angle-based properties:
    Uniform/isotropic: the property may be the same for any angle of incidence (the angle the ray hits the surface relative to the surface normal)
    Angular dependent: the property may vary as a function of angle. For example, some objects have a lot higher reflectivity when light hits it nearly tangentially
Reflection/refraction type-based (the percent of the three types can be specified):
    Specular (a): the angle that a ray reflects or refracts off a surface may be determined by its angle of incidence and index of refraction (for refraction) using Snell's law.
    Diffuse (b): the angle of reflection or refraction may not be dependent on the angle of incidence. The distribution of the scatter is often described using Lambertian reflection where the distribution falls off with the cosine from the surface normal.
    Semi-specular/mixed (c): the angle of reflection or refraction may be partially dependent on the angle of incidence.

Figure 7:
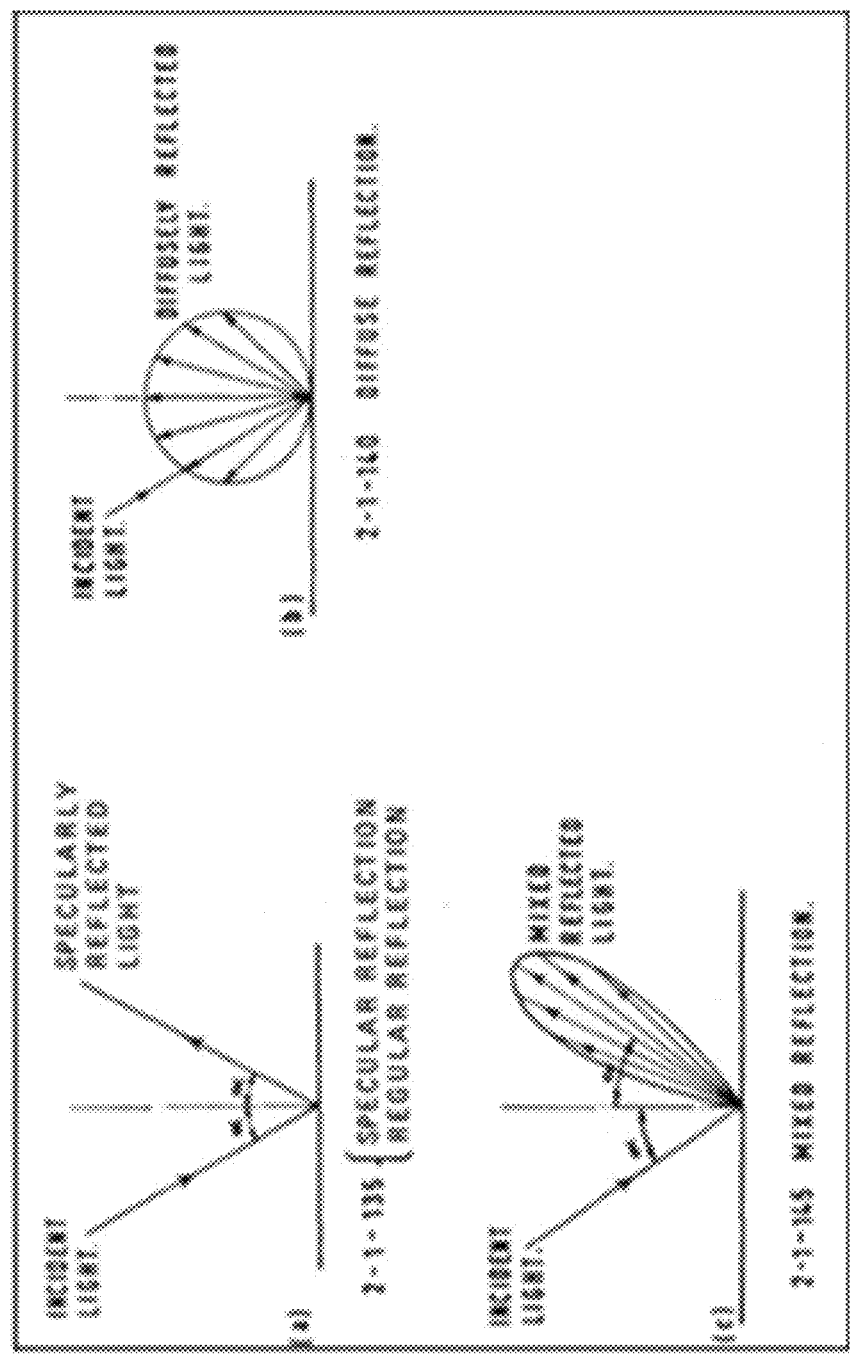
FIG. 7 depicts examples of specularly reflected light, diffusely reflected light, and mixed reflected light from a surface

FIG. 7 depicts examples of specularly reflected light, diffusely reflected light, and mixed reflected light from a surface.

The randomization module 208 may provide randomization and/or control for ray generation from one or more sources. In various embodiments, the randomization module 208 determines randomization (e.g., utilize Monte Carlo processes) for tracking path of a ray from the LiDAR source to the environment. For example, the ray may be straight from the LiDAR source, but the point of generation and the angle from the LiDAR source may be different. Further, the randomization module 208 may determine randomization for interactions with objects (e.g., to assist in reflection or refraction interactions and energy consumed).

In various embodiments, the randomization module 208 utilizes Monte Carlo ray tracing (MCRT), although it will be appreciated that the randomization module 208 may utilize any randomization approach or combination of approaches (e.g., an ensemble).

The ray generation module 210 may simulate the rays emitted by one or more simulated sources within the simulated environment. The ray generation module 210 may determine the characteristics of one or more simulated rays within the simulated environment. The ray generation module 210 may determine the point (e.g., origin) from which each ray is initially generated (e.g., which source if there is more than one LiDAR source in the simulation), the direction of the ray, wavelength(s) of the ray, and/or energy of the ray. In some embodiments the ray generation module 210 may generate the following ray properties for each ray in the simulation:

Energy (E)
Wavelength (λ)
Origin coordinates (x, y, z)
Direction (i, j, k)

Figure 3:
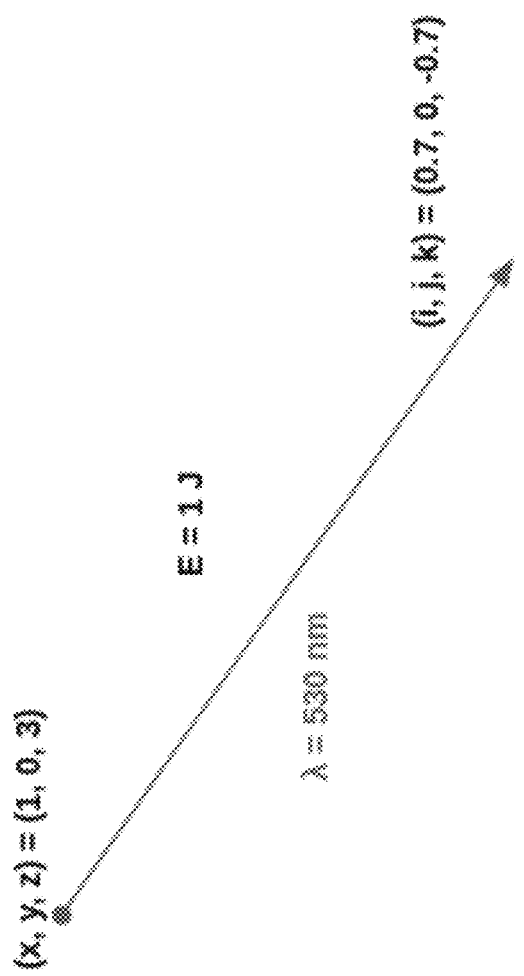
FIG. 3 is an example of a simulated ray from a simulated source.

FIG. 3 is an example of a simulated ray from a simulated source. The ray may model a collection of photons following a single path. In this example, the wavelength of a selected ray is 530 nm, the energy is 1 Joule, the origin coordinates is (1, 0, 3) and the direction is (0.7, 0, −0.7).

The ray generation module 210 may utilize randomization from the randomization module 208 to determine one or more of these ray properties. In various embodiments, there is a bounded number of variations for each ray property. The randomization module 208 and/or ray generation module 210 may determine a value for one or more ray properties that is bound by a possible range of options.

As discussed herein, the randomization module 208 utilizes Monte Carlo Ray Tracing. Ray tracing involves following the path of multiple simulated light rays (often millions) from their emission from a light source until they are absorbed by an object or part of an environment.

Here, ray tracing refers to the use of randomly generating outcomes of interactions drawn from empirical or first-principle distributions. As an example, imagine a simple model of the sun as viewed from the Earth's surface. The sun radiates light over a large range of wavelengths including UV, visible, and infrared and the atmosphere selectively attenuates depending on the wavelength. For each ray from the model sun, a wavelength is randomly selected from the distribution. If this is done a sufficient number of times, a distribution of the results can be measured as an estimation of the original.

As discussed herein, the atomic unit describing light in ray tracing is the "ray." While light could be modeled as waves, in ray tracing, light is considered to behave like rays (e.g., packets of light traveling in straight lines until they interact with a new object).

The ray tracking module 212 may track any number of rays (e.g., all rays) within a simulation including interactions rays with the environment including simulated objects and the like.

Figure 8:
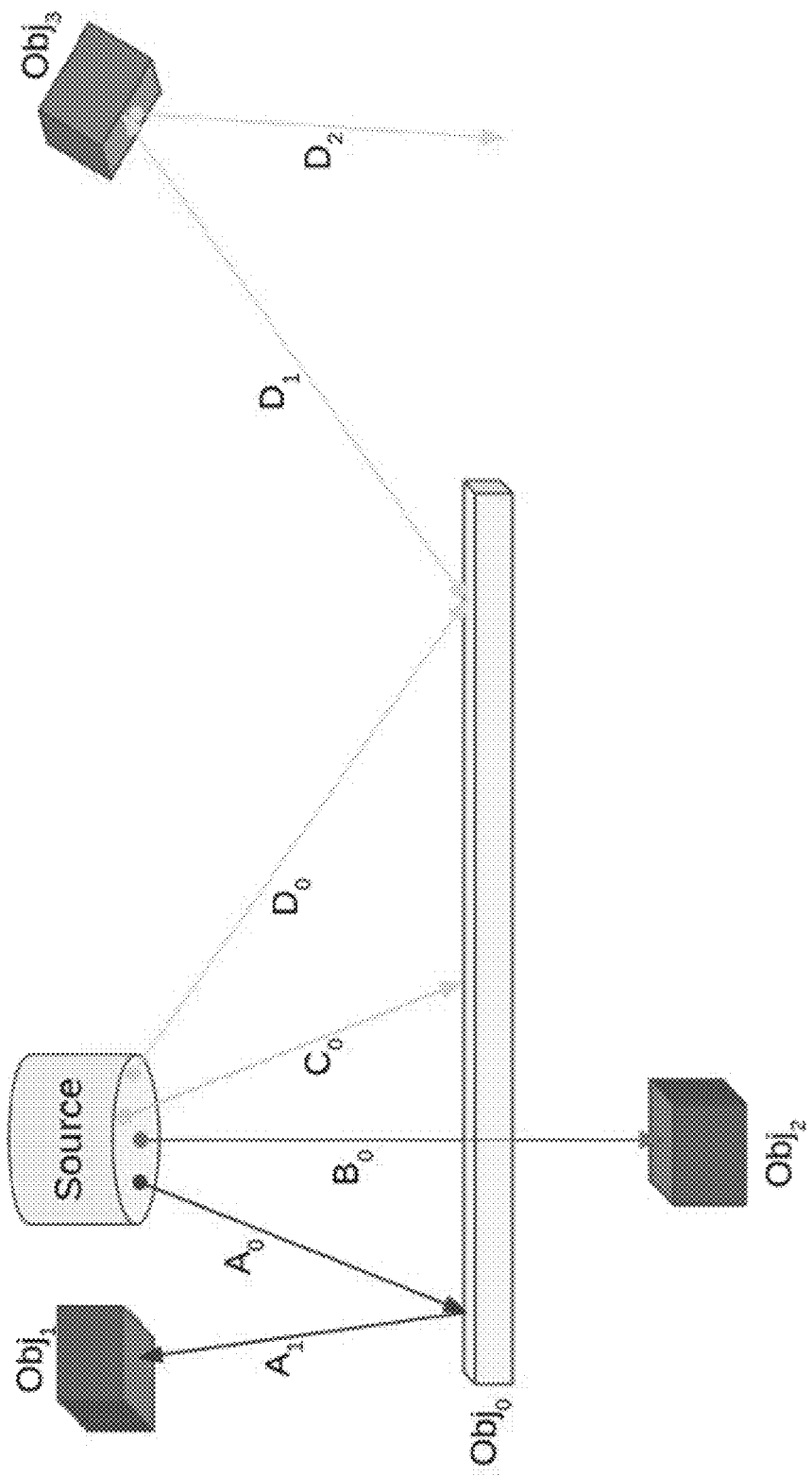
FIG. 8 depicts an example of tracking four rays from a simulated source.

FIG. 8 depicts an example of tracking four rays from a simulated source. The ray tracking module 212 may track rays generated by the ray generation module 210 in the simulated environment generated by the environment module 202.

In FIG. 8, ray A emits as blue, reflects semi-specularly off of Obj0 (e.g., object 0) based on the material properties of Obj0, the reflected light is subsequently absorbed by Obj1 (e.g., object 1). Ray B emits as red and transmits through Obj0 (e.g., based on the transmissivity of the material of Obj0). The remaining ray B (e.g., that which was not absorbed by Obj0) that transmitted through Obj0 is absorbed by Obj2 (e.g., object 2). Ray C emits as green and is completely absorbed by Obj0. Ray D emits as yellow and reflects specularly off Obj0 (based on the material property of Obj0). The ray that reflects specularly off of Obj0 then interacts with Obj3 (e.g., object 3) by reflecting semi-specularly. There are no more interactions in this example. All modeled rays in FIG. 8 are absorbed by the environment. In this example, since no part of a ray was received by a receiver (e.g., at the simulated source), no measurements were taken and no point cloud data may be generated.

Figure 9:
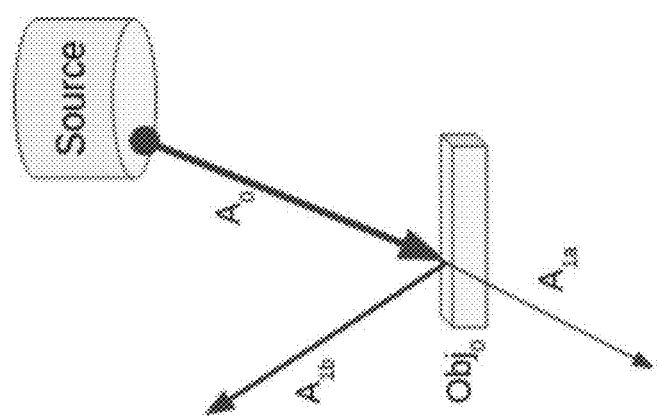
FIG. 9 depicts an example of ray splitting on a translucent object.

FIG. 9 depicts an example of ray splitting on a translucent object. In this example, the ray tracking module 212 may track ray splitting caused by an interaction with the translucent or semi-translucent object. In FIG. 9, a ray $A_0$ is emitted by a simulated source. Ray $A_0$ interacts with Obj0 (e.g., object 0). Ray $A_0$ splits between ray $A_{1b}$ which passed through Obj0 and ray $A_{1a}$ which reflects off of Obj0.

In some embodiments, it is often useful to model multiple possible solutions for each ray. For example, if a ray with 1 AU hits a translucent surface (e.g., the surface of Obj0 in FIG. 8) that has a reflectivity of 50% and a transmissivity of 25%, the ray tracking module 212 may follow two child rays: 1) reflected ray with 0.5 AU and 2) transmitted ray with 0.25 AU.

The simulation module 214 generates the simulation including the objects, materials, environment, source(s), and rays. Further, the simulation module 214 and/or the ray tracking module 212 may detect when rays are received by a receiver and determine measurements based on the received rays to generate point cloud data.

Various embodiments may utilize different ray tracing models. For example, the simulation module 214 and/or the ray tracing module 212 may model the geometry and properties to best imitate the real system. In some embodiments, the simulation module 214 and/or the ray tracing module 212 may model the function and behavior of the system.

Figure 10:
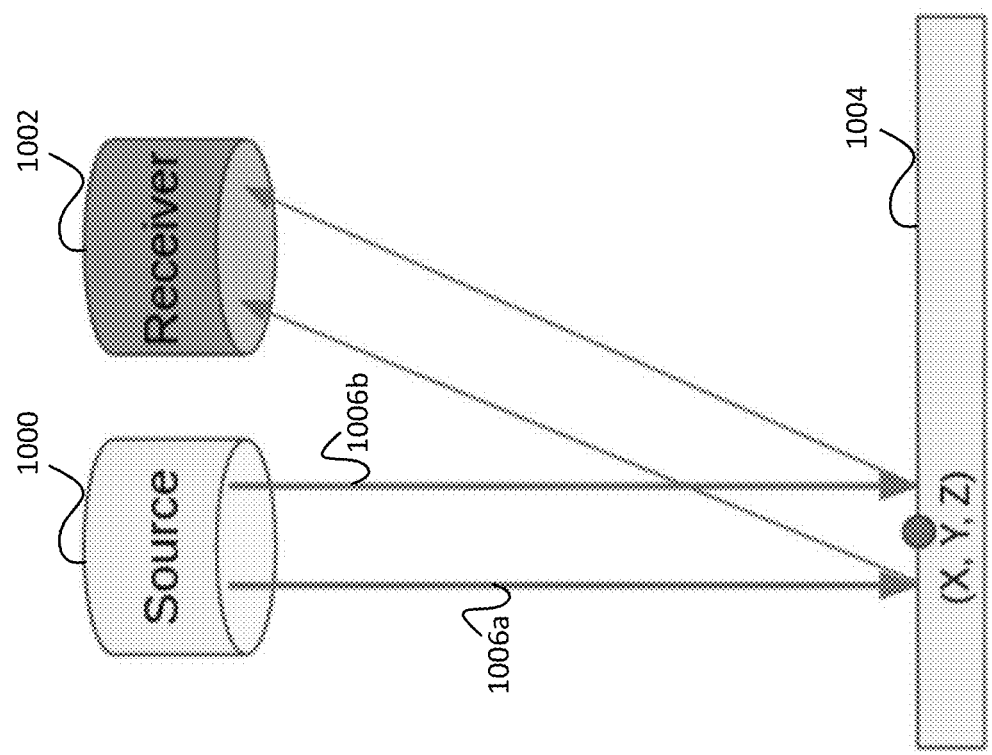
FIG. 10 depicts an example model of a LiDAR sensor.

In some embodiments, for active sensors (e.g., LiDAR, SAR, and/or the like), the simulation module 214 and/or the ray tracing module 212 may model two main functions: the emitter/source and the receiver. FIG. 10 depicts an example model of a LiDAR sensor. In this example, the LiDAR sensor is modeled as a simple source 1000 and receiver 1002.

By modeling an active sensor as suggested, the simulation module 214 and/or the ray tracing module 212 may model the aggregate properties and errors accumulated by the optics leading up to the "source" interface (e.g., laser+mirrors+window). Some attributes of a LiDAR source (e.g., source 1000) may include but are not limited to:

Power of source
Radius of beam at source
Divergence angle of source
Wavelength(s) of source
Errors in optics
Losses from optics Each of the attributes of the LiDAR source may be a source property as discussed herein. The power of the source property may indicate the power of simulated source and/or range of power of the source. The radius of the beam at source property may indicate a specific radius (or diameter) or a range for a ray radius (or diameter). The divergence angle of the source property may indicate the direction of a ray. The divergence angle of the source property may indicate a specific angle or a range of angles. The wavelength(s) of source property indicates on or more specific wavelengths of rays that may be emitted by the source or a range of wavelengths that may be emitted by the source. The errors in optics and losses in optics properties may be associated with known errors and losses of particular sources (e.g., particular models or brands of LiDARs). In various embodiments, the errors in optics properties may include a specific number associated with error or a range of values associated with errors. Similarly, the losses in optics properties may include a specific number associated with loss or a range of values associated with optical losses.

As discussed herein, when there is a range of values associated with a property, the synthetic cloud data generation system 200 may select one or more values utilizing randomization (e.g., from the randomization module 208 and/or models (e.g., distributions) of values associated with different properties (e.g., errors in optics may be selected from a range based on a gaussian distribution).

Returning to FIG. 10, the simulation module 214 and/or ray tracking module 212 may define the x, y, z position of one or more points by the average position of reflection that surviving rays that return to the receiver for a given return from a given pulse. However, the direct output of the ray tracing simulation may include all rays and their interactions. To make use of the output, post-processing may be performed on the raw data. See FIG. 10 a simple example of a single pulse with only 1 return (e.g., as reflected from object 1004).

In various embodiments, measured at the receiver (or the source that contains a receiver), intensity represents the pulse return magnitude. In one example, the intensity may be modeled in two steps: 1) directly within the ray tracing simulation and 2) during post-processing.

During the simulation, the simulation module 214 may measure intensity based on one or more of the following properties discussed herein: laser power, attenuation, reflection loss, transmission loss, stray rays, and/or receiver sensitivity.

During post processing, the simulation module 214 may measure intensity based on one or more of the following properties discussed herein: ray aggregation, clustering multiple rays into a single point, receiver sensitivity, model losses (e.g., due to things like scan angle), and/or normalization.

Figure 11B:
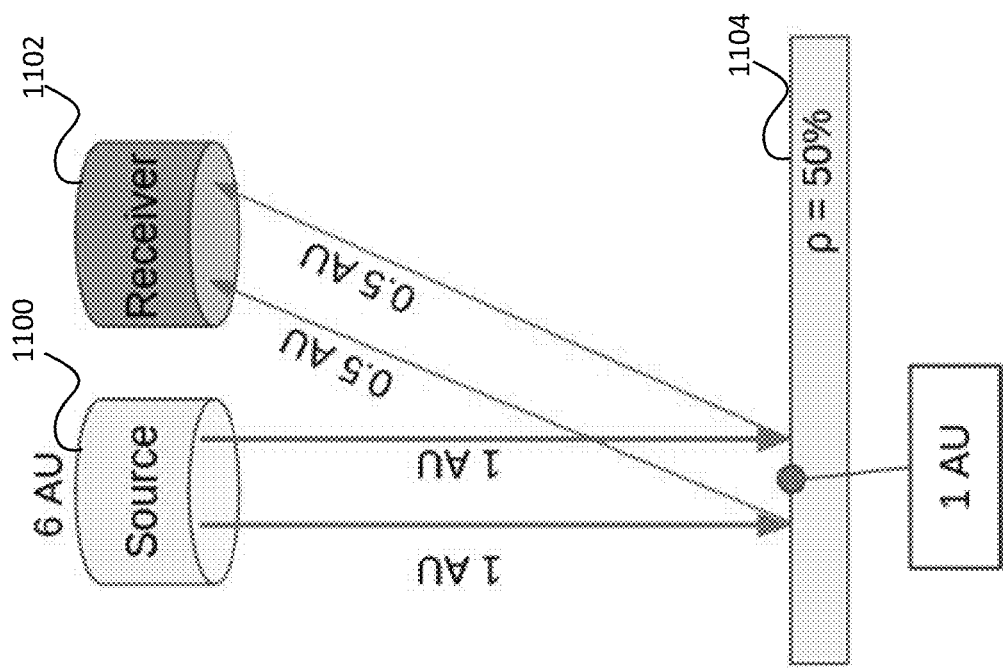
FIG. 11b depicts the aggregation of rays in the example.
Figure 11A:
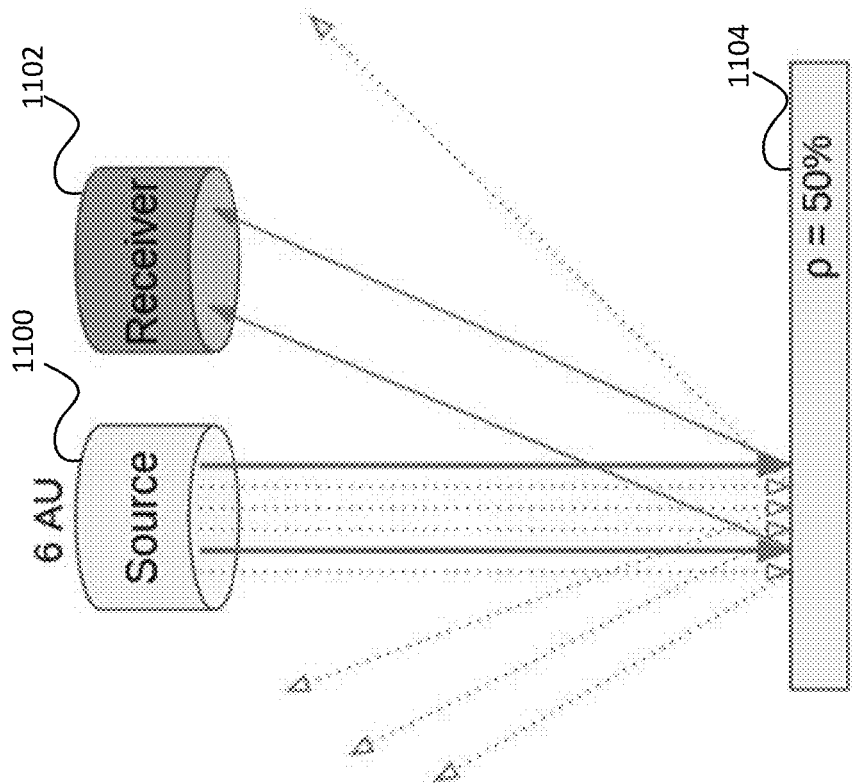
FIG. 11a depicts six rays emitted from a source with two rays landing on the receiver 1102 in a simulation in one example.

FIGS. 11*a* and 11*b* depict ray aggregation in some embodiments. FIG. 11*a* depicts six rays emitted from a source 1100 with two rays landing on the receiver 1102 in a simulation in one example. FIG. 11*b* depicts the aggregation of rays in the example.

In some embodiments, ray aggregation may be used to represent a single pulse. In this example, a source 1100 with a power of 6 AU emits 6 rays (1 AU each). All of the rays hit a diffusely reflective object 1104 with a reflectivity of 50%. Using split rays, all reflected child rays now have 0.5 AU. Two of the reflected rays land on the receiver 1102. In FIG. 11*b*, the simulation module 214 assigns a single point at the Cartesian center of the two reflections with a power of 1 AU (e.g., 0.5 AU*2 rays). In other words, the point assigned to the reflection from the object 1104 is assigned an intensity of 1 AU by summing the contribution of surviving rays (depicted in FIG. 11*a*).

In post-processing, the simulation module 214 may determine a point's return number and number of returns. In some embodiments, the simulation module 214 may perform ray aggregation for each collection of interactions by clustering rays with similar ray path lengths.

Figure 12:
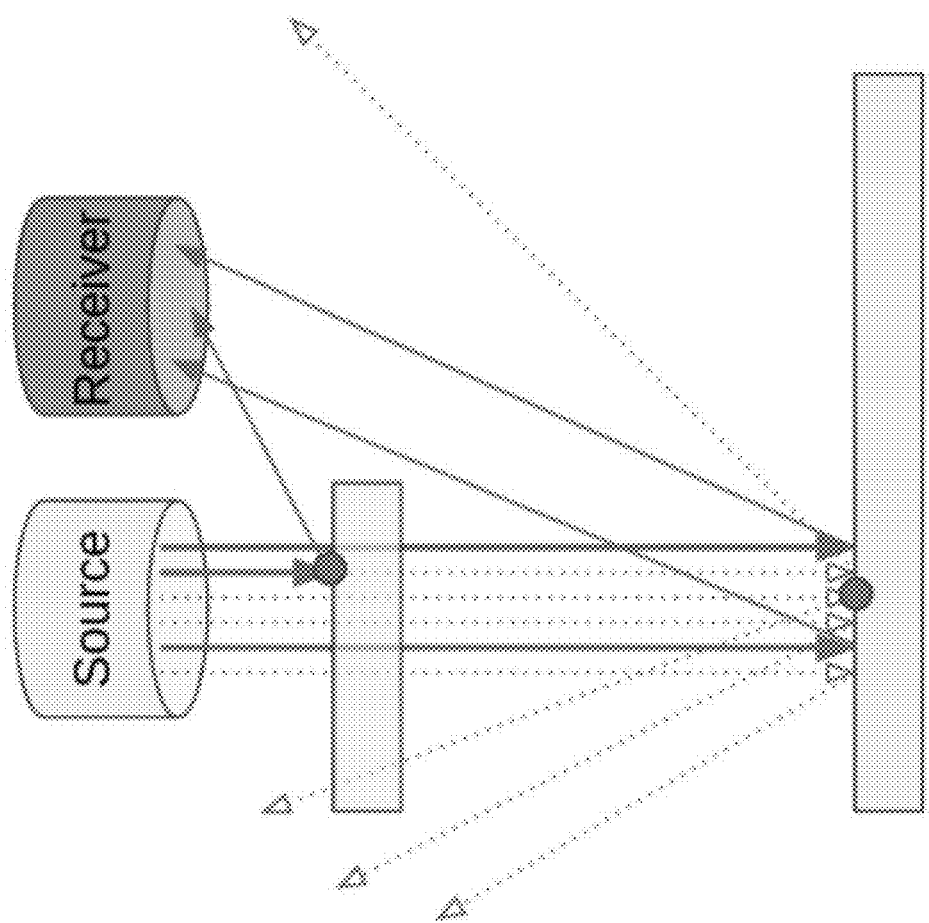
FIG. 12 depicts an example of multiple returns from a single pulse.

FIG. 12 depicts an example of multiple returns from a single pulse. In this example, the upper point may be assigned a return number of 1 while the lower point may be assigned a return number of 2.

The classification module 220 may assign labels for any object. In some embodiments, for any point that is reflected off of a labeled object of interest may be assigned by the classification module 220 to the corresponding classification. All other points may be assigned as "unclassified."

To create a simplified model of the receiver, the simulation module 214 and/or the ray tracing module 212 may aggregate effects from the receiver subcomponents.

Some attributes of a receiver (e.g., receiver 1002 which may be part of the source 1000) may include but are not limited to:
 Losses from optics
 Errors in optics
 Sensitivity of detector
 Losses by incidence scan angle For a passive sensor such as a camera, the simulation module 214 and/or the ray tracing module 212 may model the light source (e.g., sun) and receiver (e.g., camera optics) on a functional, macro level.

The cloud generation module 216 generates point cloud data for one or more (e.g., every) rays that are received by any number of receivers (e.g., each receiver being a part of the one or more simulated sources).

In various embodiments, the cloud generation module 216 stores measurements and point cloud data in a data format. FIG. 13 shows a data format example for some embodiments. The data format may accept a variety of scalar fields for each point.

Many of the values in the data format in FIG. 13 can be simply assigned from the simulation parameters such as scan direction, edge of flight line, scan angle, and point source ID.

As discussed herein, the simulation module 214 and/or ray tracking module 212 may define the x, y, z position (e.g., see the data format in FIG. 13) of one or more points by calculating the average position of reflection that surviving rays that return to the receiver for a given return from a given pulse. As discussed herein, to make use of the output, post-processing may be performed on the raw data.

Intensity, as shown in the data format of FIG. 13 and discussed herein, may be measured at the receiver and may represent the pulse return magnitude. As discussed herein, in some embodiments, intensity may be modeled in 1) directly within the ray tracing simulation, and/or 2) during post-processing.

Return number and number of returns (given pulse) may be determined based on ray aggregation as discussed herein. As shown in FIG. 12, ray aggregation may occur for each collection of interactions by clustering rays with similar ray path lengths to determine the return number and number of returns.

Classification may be an ID associated with a classification or label provided by the classification module 220. The point source ID may be an ID associated with the simulated source and/or an object ID that a ray interacted with before being received by the receiver.

The storage module 218 may store the cloud data. The cloud data may be in any format. The storage module 218 may include a computer-readable medium as described herein. Although the storage module 218 is shown as being within the synthetic cloud data generation system 200 it will be appreciated that there may be any number of storage mediums (e.g., local or remote to the synthetic cloud data generation system 200) and the data may be stored in any number of formats.

The classification module 220 may apply object class code to every point within the cloud, for a complete semantic segmentation of the data. The classification module 220 may be a neural network that performs semantic segmentation. The classification module 220 may label objects by assigning a classification code to each point (e.g., class codes as defined by the American Society for Photogrammetry and Remote Sensing (ASPRS)).

The classification module 220 may apply a deep-learning approach that considers every individual point and assigns its class label by considering the spatial relationships between the target point and its nearest neighbors, with nearest neighbors re-calculated at each layer of the network.

The classification module 220 may have the capacity for adding new object types using the same fundamental network architecture. Individual objects may be segmented out of the cloud using this as a starting point. In some embodiments, the classification module 220 uses a cascade of individual classifiers that all use a combination of supervised and unsupervised methods. In various embodiments, the cascade of binary classifiers enables the classification module 220 to use the natural priors of the world (true incidence rate) and the true/false positive rate to maximize overall accuracy.

A module may be hardware, software, firmware, or any combination. For example, each module may include functions performed by dedicated hardware (e.g., an Application-Specific Integrated Circuit (ASIC), a Field Programmable Gate Array (FPGA), or the like), software, instructions maintained in ROM, and/or any combination.

Figure 14:
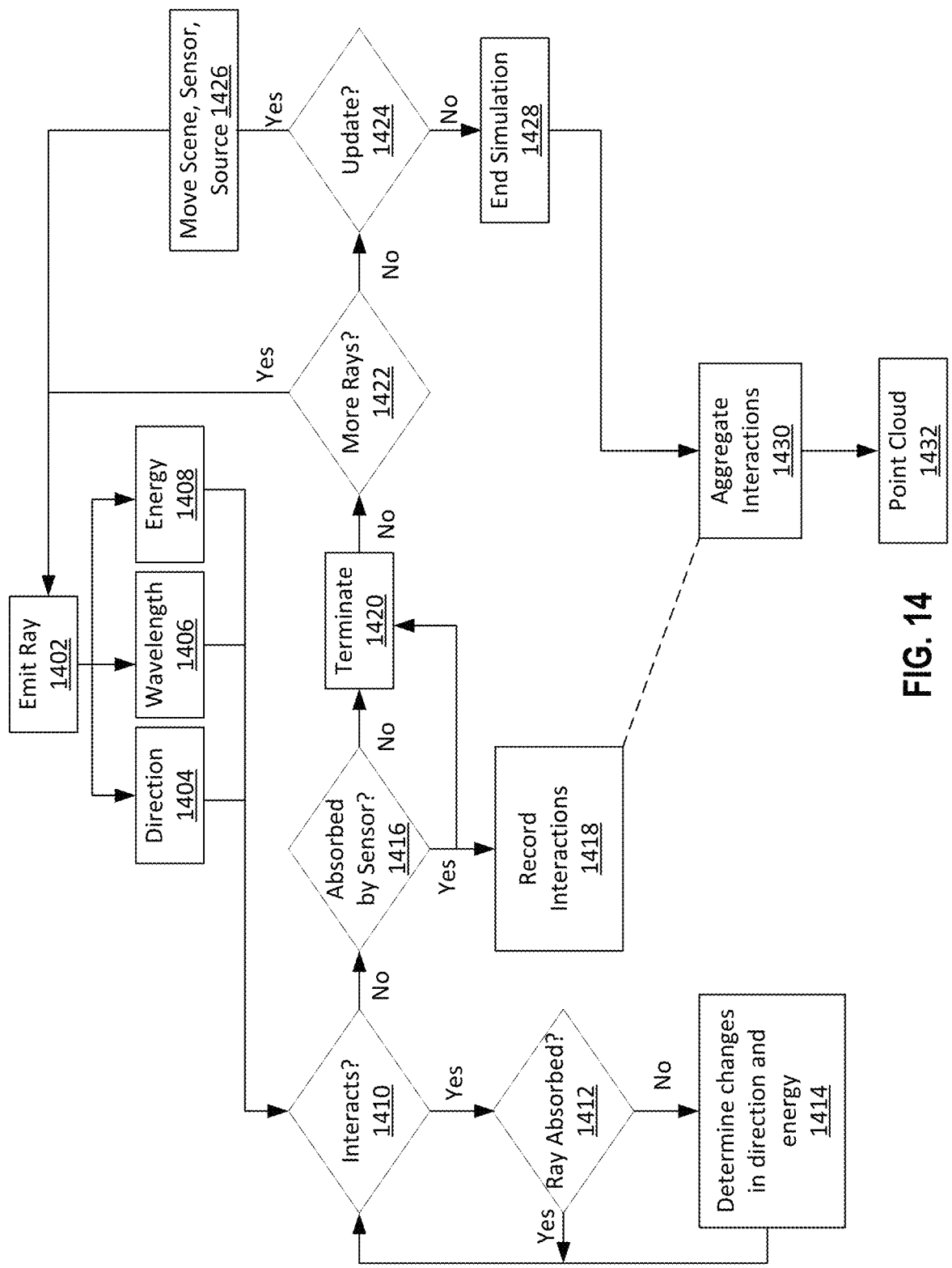
FIG. 14 is a flowchart for generating a point cloud in some embodiments.

FIG. 14 is a flowchart for generating a point cloud in some embodiments. In this example, the environment module 202 generates a scene including objects within the scene (as defined by the object module 206). In various embodiments, a user. May identify one of a plurality of environments within a graphical user interface (e.g., via the synthetic cloud data generation system 200). The synthetic cloud data generation system 200 may be accessible over a network (e.g., via a smart phone, computer, or any digital device) or locally. Once an environment is selected (e.g., from a pull-down menu), the environment module 202 may optionally provide options for different areas or areas within an environment for the user to select (e.g., from a pull-down menu, provide suggestions, or a checklist). Alternately, the environment module 202 may select one or more areas and generate one or more environments.

Each environment may have objects associated with that area. For example, a plurality of objects may be associated with a room (e.g., chairs, a table, and a sofa for a living room). In some embodiments, the environment module 202 may select a number of objects and object types based on input from the randomization module 208 (e.g., randomly selecting a number of objects within a predetermined range of a number of objects and/or randomly selecting different object types of a predetermined range of object types).

The user may also provide a particular source (e.g., a pulldown menu of LiDAR options). Each selected source may have properties (e.g., such as power, wavelength, size, losses, errors, and/or the like) in the simulated environment that parallel the real-world counterpart.

As discussed herein, each object may include any number of properties and the environment may have different amounts of materials with their own properties. The synthetic cloud data generation system 200 may select from a range from one or more properties using the randomization module 208 or a weighted methodology.

In step 1402, the simulation module 214 simulates emitting one or more rays from a simulated source. Each ray in the simulation may have a direction 1404, a wavelength 1406, and an energy 1408. In various embodiments, the direction, wavelength, and energy of each emitted ray may be within a different predetermined range. Each predetermined range may be based in part on the type of source (e.g., different LiDAR devices may have different wavelengths they are prone to generate at different energies and at different directions). The direction of the ray will also begin at an origin point based on position of the simulated source within the environment.

The ray tracking module 212 tracks each ray within the simulated environment. For each ray, in step 1410, the ray tracking module 212 determines if the ray interacts with an object or sensor (e.g., a receiver). If the ray interacts (e.g., intersects or hits) with an object (i.e., not a sensor) or a part of the environment, the ray tracking module 212 may determine if the ray is absorbed by the object in step 1412. When a ray interacts or hits an object or material, the environment module 202 and/or simulation module 214 may determine if any of the ray is absorbed or partially absorbed based on properties (e.g., absorption properties) of the object or material that was hit. In some embodiments, the simulation module 214 utilizes a physics engine to determine an amount of energy absorbed. If the ray is completely absorbed, the flowchart returns to step 1410 to determine if there is any other interactions. If not (and there would not be any interactions if the ray is absorbed by the object or material), the ray may be determined to terminate in step 1420 (after determining that the ray was not absorbed by sensor in step 1416).

If the ray was not absorbed or only partially absorbed, the simulation module 214 may determine changes in direction and energy of any resulting rays caused from the interaction. The simulation module 214 may utilize a physics engine or the like based on properties of the object or material that interacted with the ray to determine changes in direction and energy. The process returns to step 1410 to track each ray stemming from or resulting from the interaction in the simulation.

In this example, the ray tracking module 212 tracks each ray and determines if there is an interaction in step 1410 and also determines if the ray is absorbed by a receiver (e.g., by a sensor at the source) in step 1416. If the ray is absorbed by the sensor, then the ray tracking module 212 and/or the simulation module 214 may take measurements of the ray (e.g., as a LiDAR) based on length of time from emission, intensity, and/or the like. The cloud generation module 216 may track and record information such as any interactions, coordinates, energy, and object class identifiers.

If there are no interactions and a ray is not absorbed by a sensor, the simulation module 214 may terminate the ray or tracking of the ray. In some embodiments, the simulation module 214 determines to terminate the ray or tracking the ray if a particular threshold of time (e.g., a length of time since the ray was emitted was met but no interactions and/or interactions with a receiver is detected or a length of time after the ray's last interaction has been exceeded).

If the simulation module 214 determines more rays need to be emitted, then the method returns to step 1402.

If additional rays need not be emitted (e.g., based on reaching one or more predetermined thresholds), the simulation module 214 may optionally determine if an update is required in step 1424. In various embodiments, the simulation module 214 may determine to change or modify the scene (e.g., to a different environment or area within the environment), the source (e.g., to another source and/or modify the properties of the existing source), and/or sensor (e.g., to another receiver and/or modify the properties of the existing receiver).

The simulation module 214 may determine to make changes to an area (e.g., a "scene") of the environment if a threshold number of measurements is reached or a predetermined amount of time for the simulation to execute has been met or exceeded. There may be a preset number of areas associated with each environment. After a predetermined number of measurements is reached and/or an amount of simulation time has elapsed, the synthetic cloud data generation system 200 may generate a new environment, determine new sources, determine new objects, determine new properties for objects and materials, and generate new rays from the simulated sources.

The simulation module 214 may make changes to sources and/or receivers if a predetermined number of measurements is not met within a particular length of time. For example, the simulation module 214 may select one or more additional or different sources and/or receivers within the environment and emit new rays from the simulated sources for additional measurements.

In step 1426, the synthetic cloud data generation system 200 may change the scene, move the sensor, update the sensor, change the source (e.g., change properties), update the source (e.g., change properties), and/or the like. The method returns to step 1402 where new rays are emitted in the simulation.

If the simulation module 214 determines that there are no more updates, the simulation may terminate in step 1428.

At the end of the simulation (or during the simulation), the cloud generation module 216 may aggregate and/or generate measurements (e.g., from the recorded interactions in step 1418) and in step 1432, the cloud generation module 216 may generate point cloud data. The point cloud data may be stored and/or formatted as discussed herein. In some embodiments, the classification module 220 may classify objects for training and/or verification and the like.

In various embodiments, the simulation module 214 may determine that a threshold of rays must be measured before terminating the simulation. A user may determine a threshold number of measurements that must be obtained before the simulation is terminated. There may be any number of criteria for termination. For example, termination may be based on a number of rays absorbed by the sensors, the number of recorded interactions, number of rays emitted into the environment, and/or the length of time for the simulation. Any of these values may be specified by the user (e.g., through a GUI) or encoded into the synthetic cloud data generation system 200.

Figure 15:
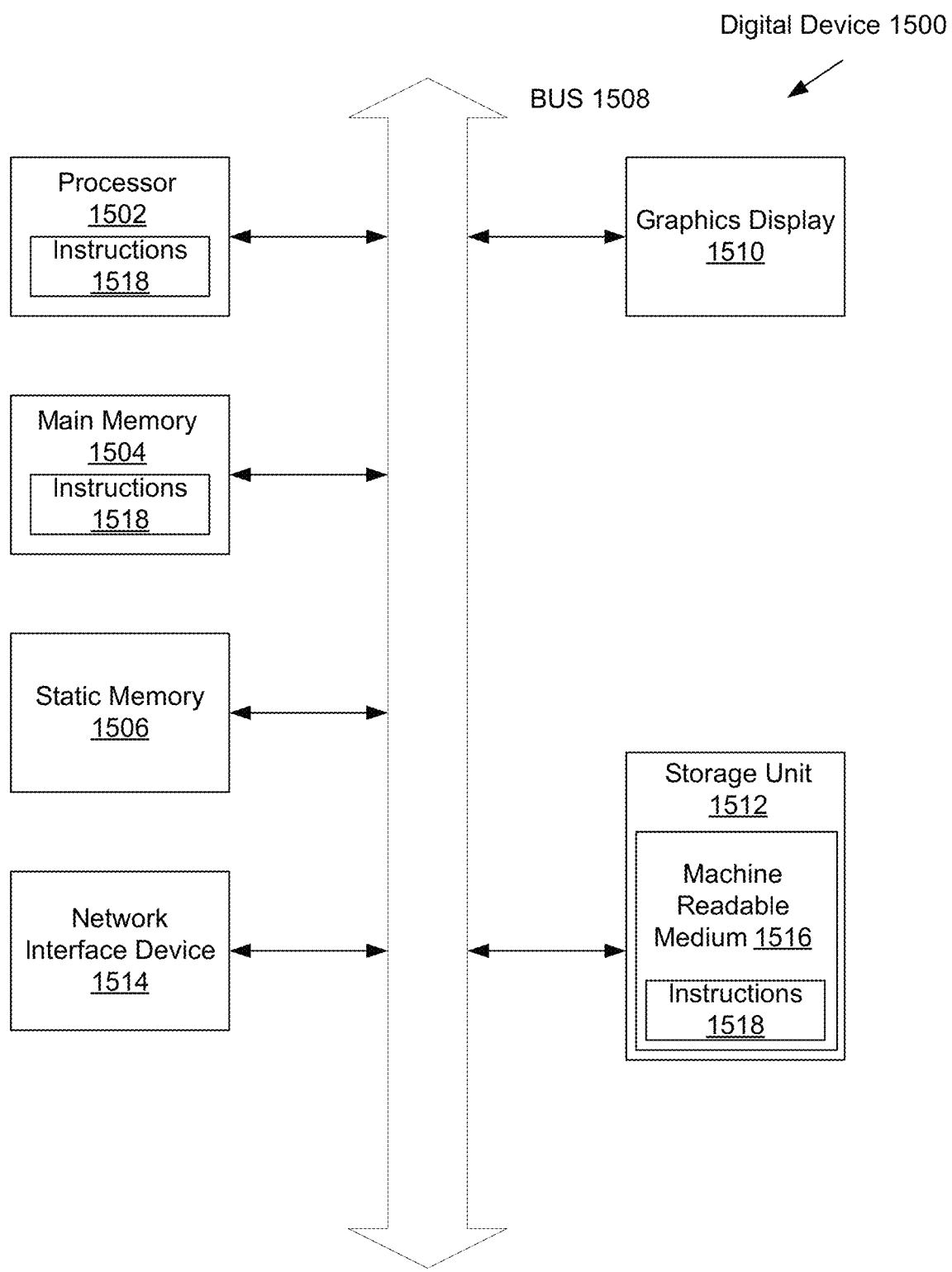
FIG. 15 depicts a block diagram of an example digital device 1500 according to some embodiments.

FIG. 15 depicts a block diagram of an example digital device 1500 according to some embodiments. Digital device 1500 is shown in the form of a general-purpose computing device. Digital device 1500 includes processor 1502, RAM 1504, communication interface 1506, input/output device 1508, storage 1510, and a system bus 1512 that couples various system components including storage 1510 to processor 1502.

System bus 1512 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Digital device 1500 typically includes a variety of computer system readable media. Such media may be any available media that is accessible by the component failure prediction system 104 and it includes both volatile and nonvolatile media, removable and non-removable media.

In some embodiments, processor 1502 is configured to execute executable instructions (e.g., programs). In some embodiments, the processor 1502 comprises circuitry or any processor capable of processing the executable instructions.

In some embodiments, RAM 1504 stores data. In various embodiments, working data is stored within RAM 1504. The data within RAM 1504 may be cleared or ultimately transferred to storage 1510.

In some embodiments, communication interface 1506 is coupled to a network via communication interface 1506. Such communication can occur via Input/Output (I/O) device 1508. Still yet, component failure prediction system 104 can communicate with one or more networks such as a local area network (LAN), a general wide area network (WAN), and/or a public network (e.g., the Internet).

In some embodiments, input/output device 1508 is any device that inputs data (e.g., mouse, keyboard, stylus) or outputs data (e.g., speaker, display, virtual reality headset).

In some embodiments, storage 1510 can include computer system readable media in the form of volatile memory, such as read only memory (ROM) and/or cache memory. Storage 1510 may further include other removable/non-removable, volatile/non-volatile computer system storage media. By way of example only, storage 1510 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 1512 by one or more data media interfaces. As will be further depicted and described below, storage 1510 may include at least one program product having a set (e.g., at least one) of program modules that are configured to carry out the functions of embodiments of the invention. In some embodiments, RAM 1504 is found within storage 1510.

Program/utility, having a set (at least one) of program modules, such as component failure prediction system 104, may be stored in storage 1510 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with component failure prediction system 104. Examples, include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention(s) are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Thus, while there have been shown and described and pointed out fundamental novel features of the inventive system and method as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. It is the intention, therefore, to be limited only as indicated by the scope of the claims appended hereto.

The invention claimed is:

1. A method comprising:
   simulating an environment including at least one simulated object, a simulated ray source, and a simulated receiver;
   simulating a plurality of rays emitting from the simulated ray source within the environment, wherein simulating the plurality of rays emitting from the simulated ray source within the environment comprises:
      retrieving a range of directions and a range of wavelengths from the simulated ray source, the range of directions being a property of the simulated ray source, the range of wavelengths being a property of the simulated ray source;
      determining a particular direction for each ray of the plurality of rays randomly from the range of directions;
      determining a particular wavelength for each ray of the plurality of rays randomly from the range of wavelengths;
      emitting each of the plurality of rays from the particular direction of the simulated ray source in the environment; and
      emitting each of the plurality of rays at the particular wavelength from the simulated ray source in the environment;

tracking each ray of the plurality of rays in the environment;
detecting changes for at least one ray that interacts with the at least one simulated object, the changes for the at least one ray including a reflection of at least part of the ray from the at least one simulated object;
tracking the reflection of the at least part of the ray from the at least one simulated object in the environment;
determining measurements for any of the plurality of rays that interact with the simulated receiver in the simulation, the at least part of the ray being received by the receiver, the measurements including intensity for any of the plurality of rays that interact with the receiver; and
generating synthetic point cloud data based on the measurements.

2. The method of claim 1, wherein the simulated ray source is a simulate LiDAR device.

3. The method of claim 1, wherein the at least one simulated object includes properties for absorption and reflectivity that define, at least in part, physics of the at least one ray upon interaction with the at least one simulated object in the simulation.

4. The method of claim 3, wherein direction and energy of the at least one ray is determined in the simulation upon interaction with the at least one simulated object.

5. The method of claim 1, wherein the simulation continues to emit rays from the simulated ray source until a predetermined number of interactions between rays and the simulated receiver in the simulation are determined.

6. The method of claim 1, wherein measurements are not determined for one or more rays of the plurality of rays are absorbed by the at least one object when the one or more rays interacts with the at least one simulated object.

7. A non-transitory computer-readable medium readable by at least one processor comprises instructions to configure the at least one processor to perform a method, the method comprising:
simulating an environment including at least one simulated object, a simulated ray source, and a simulated receiver, wherein simulating a plurality of rays emitting from the simulated ray source within the environment comprises:
retrieving a range of directions and a range of wavelengths from the simulated ray source, the range of directions being a property of the simulated ray source, the range of wavelengths being a property of the simulated ray source;
determining a particular direction for each ray of the plurality of rays randomly from the range of directions;
determining a particular wavelength for each ray of the plurality of rays randomly from the range of wavelengths;
emitting each of the plurality of rays from the particular direction of the simulated ray source in the environment; and
emitting each of the plurality of rays at the particular wavelength from the simulated ray source in the environment;
simulating a plurality of rays emitting from the simulated ray source within the environment;
tracking each ray of the plurality of rays in the environment;
detecting changes for at least one ray that interacts with the at least one simulated object, the changes for the at least one ray including a reflection of at least part of the ray from the at least one object;
tracking the reflection of the at least part of the ray from the at least one object in the environment;
determining measurements for any of the plurality of rays that interact with the simulated receiver in the simulation, the at least part of the ray being received by the receiver, the measurements including intensity for any of the plurality of rays that interact with the receiver; and
generating synthetic point cloud data based on the measurements.

8. The non-transitory computer-readable medium of claim 7, wherein the simulated ray source is a simulate LiDAR device.

9. The non-transitory computer-readable medium of claim 7, wherein the at least one simulated object includes properties for absorption and reflectivity that define, at least in part, physics of the at least one ray upon interaction with the at least one simulated object in the simulation.

10. The non-transitory computer-readable medium of claim 9, wherein direction and energy of the at least one ray is determined in the simulation upon interaction with the at least one object.

11. The non-transitory computer-readable medium of claim 7, wherein the simulation continues to emit rays from the simulated ray source until a predetermined number of interactions between rays and the simulated receiver in the simulation are determined.

12. The non-transitory computer-readable medium of claim 7, wherein measurements are not determined for one or more rays of the plurality of rays are absorbed by the at least one object when the one or more rays interacts with the at least one object.

13. A non-transitory computer-readable medium by at least one processor comprising instructions to configure the at least one processor to perform a method, the method comprising:
simulating an environment including at least one simulated object, a simulated ray source, and a simulated receiver, wherein simulating a plurality of rays emitting from the simulated ray source within the environment comprises:
retrieving a range of directions and a range of energy from the simulated ray source, the range of directions being a property of the simulated ray source, the range of energy being a property of the simulated ray source;
determining a particular direction for each ray of the plurality of rays randomly from the range of directions;
determining a particular energy for each ray of the plurality of rays randomly from the range of energy;
emitting each of the plurality of rays from the particular direction of the simulated ray source in the environment; and
emitting each of the plurality of rays at the particular energy from the simulated ray source in the environment;
simulating a plurality of rays emitting from the simulated ray source within the environment;
tracking each ray of the plurality of rays in the environment;
detecting changes for at least one ray that interacts with the at least one simulated object, the changes for the at least one ray including a reflection of at least part of the ray from the at least one object;

tracking the reflection of the at least part of the ray from the at least one object in the environment;

determining measurements for any of the plurality of rays that interact with the simulated receiver in the simulation, the at least part of the ray being received by the receiver, the measurements including intensity for any of the plurality of rays that interact with the receiver; and generating synthetic point cloud data based on the measurements.

* * * * *